United States Patent [19]
Toida et al.

[11] Patent Number: 5,901,801
[45] Date of Patent: May 11, 1999

[54] MOTOR WITH GEAR REDUCER, AND ASSEMBLY METHOD AND MAINTENANCE METHOD FOR SAME

[75] Inventors: Naoya Toida; Yoshiaki Kotani; Yosihisa Hirose; Yosihiro Iijima; Hiroo Kanke, all of Wako, Japan

[73] Assignee: Honda Giken Kogyo Kabushiki Kaisha, Tokyo, Japan

[21] Appl. No.: 08/732,607

[22] Filed: Oct. 16, 1996

[30] Foreign Application Priority Data

Oct. 20, 1995 [JP] Japan ..................................... 7-295947

[51] Int. Cl.⁶ ..................................................... B60K 1/00
[52] U.S. Cl. ............................................. 180/65.1; 310/71
[58] Field of Search .................................. 180/65.1, 65.6, 180/65.7; 310/67 R, 71, 80, 20

[56] References Cited

U.S. PATENT DOCUMENTS

| | | | |
|---|---|---|---|
| 5,163,528 | 11/1992 | Kawamoto et al. | |
| 5,633,544 | 5/1997 | Toida et al. | 310/67 R |
| 5,691,584 | 11/1997 | Toida et al. | 310/67 R |
| 5,793,132 | 8/1998 | Hirose | 310/71 |

FOREIGN PATENT DOCUMENTS 0 697 759  2/1996  European Pat. Off. .

4-185532  7/1992  Japan .

OTHER PUBLICATIONS

Patent Abstracts of Japan, vol. 016, No. 503 (M–1326), Oct. 16, 1992.

*Primary Examiner*—Robert J. Oberleitner
*Assistant Examiner*—Faye M. Fleming
*Attorney, Agent, or Firm*—Frishauf, Holtz, Goodman, Langer & Chick

[57] ABSTRACT

A motor with a gear reducer includes a housing, a stator secured to the housing and having an inner periphery thereof defining a central space therein, and a rotor formed of a magnet material and rotatably fitted in the central space of the stator. The rotor has an axial through hole formed therein in coaxial relation to an axis of rotation of the rotor. An output shaft is connected through a gear reducer to the rotor to be rotatively driven thereby, for outputting a rotating output from the rotor through the gear reducer. The output shaft extends through the axial through hole of the rotor and is rotatably supported by opposite ends of the housing. The rotor has a gear forming part of the gear reducer formed thereon at one end thereof, and a hook formed thereon at another end thereof and engageable with a moving device such as an assembly jig in an axial direction of the output shaft.

9 Claims, 7 Drawing Sheets

MOTOR WITH GEAR REDUCER, AND ASSEMBLY METHOD AND MAINTENANCE METHOD FOR SAME

BACKGROUND OF THE INVENTION

1. Field of the Invention

This invention relates to a motor with a gear reducer, which is suitable for use as a wheel motor for vehicles, etc., and an assembly method and a maintenance method for the same.

2. Prior Art

Conventionally, there are known wheel motors for use as power sources of industrial vehicles including materials handling equipment, etc. These wheel motors for vehicles include an electric motor, a gear reducer for reducing a rotative driving force from the electric motor, and a housing accommodating the electric motor and the gear reducer.

Wheel motors of this kind, which are equipped with a gear reducer, especially require that the electric motor and the gear reducer should be mounted so as not to interfere with the body of a vehicle on which the wheel motor is mounted, when wheels of the vehicle move upward and downward or when the vehicle is turning. This raises a problem of a limited space within the vehicle in which the electric motor and the gear reducer are to be mounted. That is, the electric motor and the gear reducer have to be designed as compact in size as possible to enable them to be mounted in a limited space within the vehicle.

Further, to obtain a relatively high output from the motor for the weight of the vehicle body, the electric motor has to be designed to produce high output torque, though it should be designed compact in size and light in weight.

To meet these requirements, attempts have been made to arrange the rotor of the electric motor and the stator of the same such that the gap between them is reduced, and form the rotor of a high-performance permanent magnet material.

In assembling the conventional wheel motor with a gear reducer, however, when the rotor is put into a housing of the motor, the rotor can collide with the stator due to a large magnetic attraction force generated between the rotor and the stator, which can give damage to the surface of the permanent magnet forming the rotor or even break the same. To solve this problem, a wheel motor with a gear reducer has been proposed by Japanese Laid-Open Patent Publication (Kokai) No. 4-185532, which is easy to mount a rotor into a housing thereof. This proposed wheel motor is, however, still complicate in construction and requires rather complicated assembly steps.

SUMMARY OF THE INVENTION

It is an object of the invention to provide a motor with a gear reducer, which is simple in construction and easy to assemble, and an assembly method and a maintenance method for the same.

According to a first aspect of the invention, there is provided a motor with a gear reducer including a housing having opposite ends, a stator secured to the housing and having an inner periphery thereof defining a central space therein, a rotor formed of a magnet material and rotatably fitted in the central space of the stator, the rotor having an axial through hole formed therein in coaxial relation to an axis of rotation of the rotor, a gear reducer, and an output shaft connected through the gear reducer to the rotor to be rotatively driven thereby, for outputting a rotating output from the rotor through the gear reducer, the output shaft extending through the axial through hole of the rotor and being rotatably supported by the opposite ends of the housing.

The motor with a gear reducer according to the first aspect of the invention is characterized by an improvement wherein the rotor has a gear forming part of the gear reducer formed thereon at one end thereof, and a hook formed thereon at another end thereof and engageable with moving means in an axial direction of the output shaft.

Preferably, the rotor has an end face at the another end thereof, the axial through hole of the rotor has a marginal edge of an open end thereof opening in the end face, the hook axially projecting from the end face of the rotor in concentricity with the marginal edge of the open end of the axial through hole of the rotor.

Also preferably, the motor with a gear reducer according to the first aspect includes bearing means rotatably supporting the rotor on the output shaft.

In a typical embodiment of the invention, the moving means is an assembling jig for assembling the rotor onto the output shaft.

To attain the object, according to a second aspect of the invention, there is provided a method of assembling a motor with a gear reducer including a housing having opposite ends, a stator secured to the housing and having an inner periphery thereof defining a central space therein, a rotor formed of a magnet material and rotatably fitted in the central space of the stator, the rotor having an axial through hole formed therein in coaxial relation to an axis of rotation of the rotor, a gear reducer, the rotor having a gear forming part of the gear reducer formed thereon at one end thereof, and a hook formed thereon at another end thereof and engageable with moving means jig in an axial direction of the output shaft, and an output shaft connected through the gear reducer to the rotor to be rotatively driven thereby, for outputting a rotating output from the rotor through the gear reducer, the output shaft extending through the axial through hole of the rotor and being rotatably supported by the opposite ends of the housing, the method comprising the steps of:

engaging the moving means with the hook of the rotor;

placing the moving means engaged with the hook of the rotor in a predetermined position with respect to the motor in which the axial through hole of the rotor is axially aligned with an axis of the output shaft; and slowly moving the rotor onto and along the output shaft by means of the moving means engaged with the hook of the rotor against a magnetic attraction force generated between the rotor and the stator, thereby mounting the rotor in a predetermined position within the motor.

Preferably, the method according to the second aspect includes the step of rotatably supporting the rotor on the output shaft via bearing means.

Also preferably, the moving means comprises engaging means having a plurality of claws for engagement with the hook of the rotor, engagement operating means for operating the engaging means for performing engagement and disengagement of the claws with and from the hook, and rotor-moving means for slowly moving the rotor along the output shaft, with the claws engaged with the hook of the rotor.

To attain the object, according to a third aspect of the invention, there is provided a method of maintaining a motor with a gear reducer including a housing having opposite ends, a stator secured to the housing and having an inner periphery thereof defining a central space therein, a rotor formed of a magnet material and rotatably fitted in the central space of the stator, the rotor having an axial through hole formed therein in coaxial relation to an axis of rotation of the rotor, a gear reducer, the rotor having a gear forming part of the gear reducer formed thereon at one end thereof, and a hook formed thereon at another end thereof and engageable with moving means in an axial direction of the output shaft, and an output shaft connected through the gear reducer to the rotor to be rotatively driven thereby, for outputting a rotating output from the rotor through the gear reducer, the output shaft extending through the axial through hole of the rotor and being rotatably supported by the opposite ends of the housing, the method comprising the steps of:

engaging the moving means with the hook of the rotor;

placing the moving means engaged with the hook of the rotor in a predetermined position with respect to the motor in which the axial through hole of the rotor is axially aligned with an axis of the output shaft; and     slowly moving the rotor along the output shaft by means of the moving means engaged with the hook of the rotor against a magnetic attraction force generated between the rotor and the stator, thereby removing the rotor from the motor.

Preferably, the moving means comprises engaging means having a plurality of claws for engagement with the hook of the rotor, operating means for operating the engaging means for performing engagement and disengagement of the claws with and from the hook, and rotor-moving means for slowly moving the rotor along the output shaft, with the claws engaged with the hook of the rotor.

The above and other objects, features, and advantages of the invention will be more apparent from the following detailed description taken in conjunction with the accompanying drawings.

DETAILED DESCRIPTION

The invention will now be described in detail with reference to the drawings showing a preferred embodiment thereof.

Figure 1:
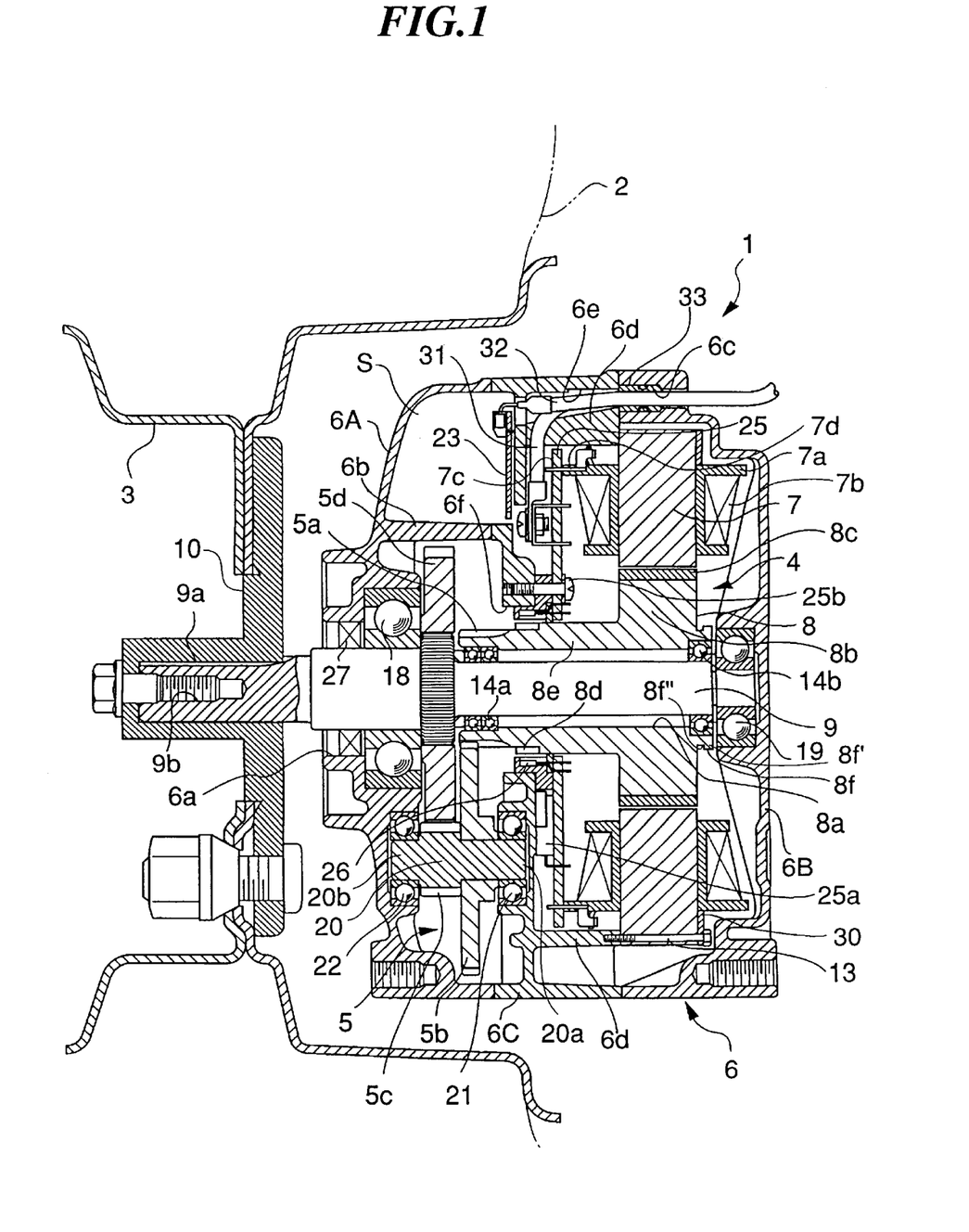
FIG. 1 is a longitudinal sectional view showing the construction of a motor with a gear reducer, which is applied to a wheel motor, according to an embodiment of the invention.

Referring first to FIG. 1, there is illustrated the construction of a motor with a gear reducer, which is applied to a wheel motor, according to an embodiment of the invention. In the figure, reference numeral 1 designates a wheel motor, which includes an electric motor 4, and a gear reducer 5, which are accommodated in a housing 6 arranged in a central space defined in a wheel 3 with a tire 2 by an inner periphery thereof. The electric motor 4 is drivingly connected through the gear reducer 5 to the wheel 3, whereby the wheel 3 is rotatively driven by a rotative driving force generated by the electric motor 4.

The housing 6 of the wheel motor 1 is comprised of an outer casing 6A having a generally cap-shaped configuration, an inner casing 6B, and a partition member 6C interposed therebetween. The outer casing 6A, the inner casing 6B and the partition member 6C are fastened together by means of bolts, not shown. The outer and inner casings 6A, 6B and the partition member 6C are formed of die castings.

The outer casing 6A has a central portion thereof formed with an axial through hole 6a, and a partition wall 6b formed integrally on an inner side surface thereof (i.e. inside the housing 6), which defines a space S having a horseshoe-shaped transverse vertical section and separated from the gear reducer 5. The inner casing 6B is fixed to a vehicle body, not shown.

The inner casing 6B has three holes 6c (only one of them is shown) formed in an outer peripheral portion thereof and extending from the partition member 6C side to an outer end surface of the inner casing 6B.

The partition member 6C has a stator-fitting portion 6d formed integrally on an outer peripheral portion thereof and axially projected toward the inner casing 6B. The stator-fitting portion 6d has three holes 6e (only one of them is shown) formed therethrough in axial alignment with the respective corresponding holes 6c of the partition member 6C. The partition member 6C has a central portion formed therein with a through hole 6f through which a central thinned portion 8e of a rotor main body 8b penetrates in a fashion being out of contact therewith.

The electric motor 4 is a brushless electric motor which is comprised of a stator 7 with a closed slot core, which is accommodated in the inner casing 6B, a permanent magnet rotor 8 rotatably arranged in a central space defined by an inner periphery of the stator 7, and an output shaft 9 disposed to transmit a rotating output (rotative driving force) from the rotor 8 through the gear reducer 5 to the wheel 3. The electric motor 4 is generally flat shaped with a short axial size, which enables a reduction in the axial size of the output shaft 9 and hence that of the whole wheel motor 1.

The stator 7 has a magnetic pole core (not shown), and a yoke core (not shown) arranged around an outer periphery of the magnetic pole core. The magnetic pole core is formed of a laminate of a multiplicity of magnetic sheets formed integrally with a plurality of projections as pole teeth extending radially outward from a central annular portion thereof through which the rotor 8 penetrates. The pole teeth are arranged circumferentially of the central annular joined portion at equal intervals, with closed slots formed between each adjacent pair of pole teeth by the central annular joined portion.

Three-phase field coils 7b are wound on the respective pole teeth of the magnetic pole core via coil bobbins 7a, forming the stator winding.

The yoke core is formed of a laminate of a multiplicity of annular magnetic sheets formed with a plurality of notches in an inner periphery thereof. These notches in the inner periphery each form an engaging groove in which the tip of a corresponding pole tooth of the magnetic pole core is fitted.

The outer periphery of the yoke core is held between the stator-fitting portion 6d of the partition member 6C and a retaining plate 30 and fixed to the stator-fitting portion 6d by means of bolts 13.

The rotor 8 has the rotor main body (enlarged diameter portion) 8b having an axial through hole (rotative central hole or hollow portion) 8a formed therein in coaxial relation to the axis of rotation of the rotor 8 and axially extending through the whole length of the rotor 8, a plurality of permanent magnet members 8c circumferentially secured to an outer peripheral portion of the main body 8b at equal intervals. The thinned portion (reduced diameter portion) 8e axially extends integrally from one end of the main body 8b and has a plurality of permanent magnet elements 8d circumferentially arranged at equal intervals for detecting the angular position of the rotor 8.

Figure 2:
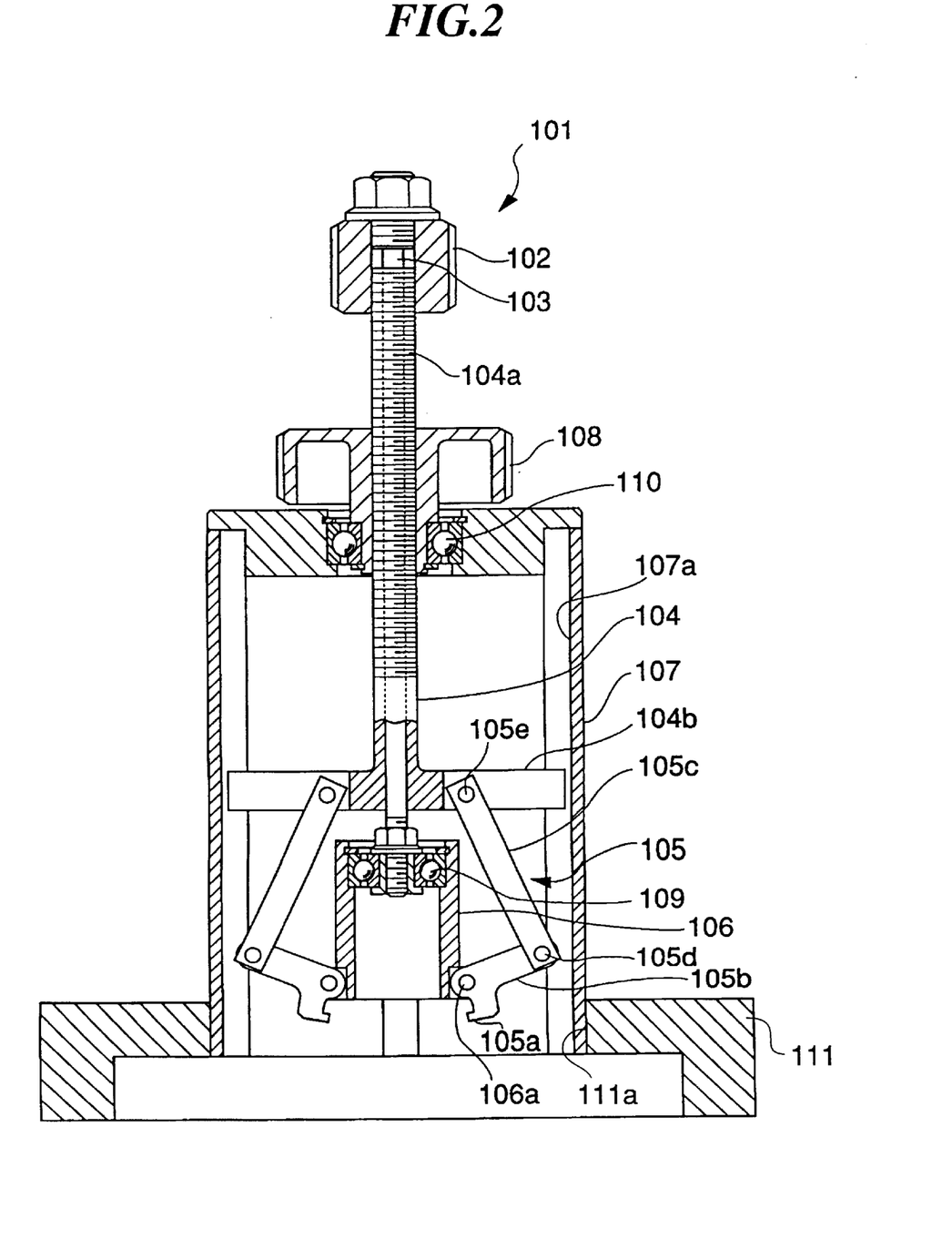
FIG. 2 is a longitudinal sectional view showing an assembly jig for use in assembling the motor with a gear reducer of FIG. 1.

The tip of the thinned portion 8e forming one end of the rotor 8 is formed integrally with teeth forming a helical gear 5a as a first gear of the gear reducer 5. The rotor 8 has the other end thereof formed integrally with an annular hook 8f for engagement with an assembly jig, hereinafter described with reference to FIG. 2. More specifically, the annular hook 8f is formed integrally on the rotor main body 8b along a marginal edge of an associated open end of the axial through hole 8a in a fashion axially projecting from an end face of the rotor main body 8b in concentricity with the axial through hole 8a. The hook 8f has an integral annular radial flange 8f' at a tip thereof defining an annular recess 8f'' between the flange 8f' and the end face of the rotor main body 8b, in which a link of the assembly jig is to be engaged. The link of the assembly jig can be engaged with the hook 8f when the jig is pulled away from the rotor or pushed against the same in the axial direction of the rotor. The hook 8f is provided in order to insert or remove the rotor 8 into or from the output shaft 9 by means of an assembly jig such as shown in FIG. 2 without contacting the central space defined in the stator 7.

The rotor main body 8b is rotatably fitted in the central space defined in the stator 7 by an inner periphery thereof, in facing relation thereto. The rotor 8 is rotatably supported on the output shaft 9 by means of bearings 14a and 14b formed by ball bearings or the like, which are force-fitted between the rotor main body 8b and the thinned portion 8e and the output shaft 9 at opposite ends of the rotor 8, for rotation about the output shaft 9.

The output shaft 9 has an end portion thereof formed therein with a key way 9a and a tapped hole 9b for fitting a wheel-mounting disk member 10 onto the shaft 9. The output shaft 9 has an axially intermediate portion thereof rotatably supported in the axial through hole 6a of the outer casing 6A via a bearing 18 formed by a ball bearing or the like, and the other end portion in a central recess formed in the inner casing 6B via a bearing 19 formed by a ball bearing or the like, respectively. An annular seal member 27 is interposed between the axial through hole 6a of the outer casing 6A and the axially intermediate portion of the output shaft 9 to seal them against the outside. The output shaft 9 is fitted through the axial through hole 8a of the rotor 8 and rotatably supported by the bearings 14a, 14b.

The gear reducer 5 is a double reduction type, which is comprised of a plurality of (four in the illustrated embodiment) gears, i.e. the gear 5a, and gears 5b, 5c and 5d. The first gear 5a is formed integrally on the tip of the thinned portion 8e (left end portion as viewed in FIG. 1) of the rotor 8 as stated before, in concentricity with the rotor 8. The second and third gears 5b, 5c are both rigidly fitted on a common rotary shaft (supporting shaft) 20, for rotation in unison with each other. The second gear 5b is in mesh with the first gear 5a. The supporting shaft 20 is located below the output shaft 9 in eccentricity therewith. The supporting shaft 20 is rotatably supported by the partition member 6C and the outer casing 6A such that an end portion 20a of the supporting shaft 20 is rotatably fitted in a recess formed in the partition member 6C via a bearing 21 formed by a ball bearing or the like, and the other end portion 20b in a recess formed in the outer casing 6A by means of a bearing 22 formed by a ball bearing or the like, respectively.

The fourth or final stage gear 5d is rigidly fitted on the output shaft 9 for rotation in unison therewith. The fourth gear 5d is in mesh with the third gear 5c. With the above arrangement, when the rotor 8 is rotated due to the action of a rotating magnetic field formed by the stator 7, the first gear 5a integral with the rotor 8 rotates together with the rotor 8, i.e. at the same rotational speed as the latter. A rotating output from the first gear 5a is transmitted through the second and third gears 5b, 5c while being reduced in speed, to the fourth gear 5d, whereby the output shaft 9 is rotated at the same rotational speed as the fourth gear 5d, i.e. at a reduced rotational speed, and in the same rotational direction as the rotor 8. For example, when the rotor 8 rotates in the positive direction at a speed of 750 rpm, the output shaft 9 rotates in the positive direction at a speed of 150 rpm, i.e. at a speed reduction ratio of 1:5 as a result of speed reduction by the gear reducer 5.

A first circuit board 23, which forms a control circuit for driving the electric motor 4, is mounted in the space S defined by the partition member 6C and the horseshoe-shaped partition wall 6e of the outer casing 6A at a location separated from the gear reducer 5 and secured to the partition member 6C by means of set screws, not shown. The first circuit board 23, which has a horseshoe-shaped surface configuration, has mounted thereon various circuit component parts, such as an IC, forming the control circuit for driving the electric motor 4. Since the space S accommodating the control circuit thus has a horseshoe-shaped configuration, it provides practically a large spatial size for accommodating various circuit component parts of the control circuit, in a limited space within the housing 6, thereby dispensing with the need of providing a space for mounting the control circuit outside the housing.

A second circuit board 25, which forms a driving circuit driven by a signal from the control circuit provided on the first circuit board 23, for supplying driving current to the electric motor 4, is mounted in a space defined by the partition member 6C and the electric motor 4. The second circuit board 25 is in the form of a doughnut in section, formed, e.g. by a bus plate with a smaller size than the inner diameter size of the stator-fitting portion 6d of the partition member 6C and secured to the plate member 6C by set screws 25b. The portions of the second circuit board 25 at which it is fixed to the partition member 6C by the set screws 25b are set so as to fall within a projection range of the rotor 8 with respect to the output shaft 9, i.e. such a range that semiconductor devices mounted on the circuit board 25, hereinafter referred to, are located within a region axially opposed to the rotor 8. The first and second circuit boards 23, 25 are connected to each other by wires including connectors.

The second circuit board 25 has a plurality of printed circuits, not shown, on both sides thereof, and through holes 7c (only one of them is shown) formed therethrough, which are connected to the printed circuits. The through holes 7c are circumferentially arranged along the outer periphery of the second circuit board 25 at equal intervals, through which end portions 7d of the respective corresponding field coils 7b are connected to the second circuit board 25. The field coils 7b are connected to each other by securely connecting between each through hole 7c and the corresponding end portion 7d of the field coil 7b.

Mounted on a surface of the second circuit board 25, which faces the partition member 6C, are a plurality of power transistors (power MOSFET's) 25a and other circuit component parts for supplying electric current to the field coils 7b via the end portions 7d thereof. The power transistors 25a and the other circuit component parts are connected to the respective corresponding printed circuits by soldering. The power transistors 25a are radially arranged on the second circuit board 25, with respect to the center of the second circuit board 25 (center of the output shaft 9), and mounted such that heat-radiating surfaces (surfaces facing the partition member 6C) of the transistors 25a are in close contact with an end surface of the partition member 6C which faces the inner casing 6B, and that at least part of the portions of the power transistors 25a in close contact with the partition member 6C are axially opposed to the rotor 8. Further, each power transistor 25a has its heat-radiating surface portion tightly held between the second circuit board 25 and the partition member 6C.

A control line 32 is connected to the first circuit board 23 to supply control signals thereto from the outside. The control line 32 is guided via one of the holes 6e formed through the stator-fitting portion 6d of the partition member 6C and the corresponding hole 6c formed through the inner casing 6B and aligned with the hole 6e, to the outside of the housing 6. A slipout-preventing element 33 is mounted on the control line 32 and fitted in the hole 6c to protect the first circuit board 23 against a pulling force applied from the outside.

Similarly, a pair of electric power lines 31 are connected to the second circuit board 25 to supply direct current for driving the electric motor 4, from the outside. The electric power lines 31 are guided via the two other corresponding holes 6e of the stator-fitting portion 6d, and then via the respective corresponding holes 6c of the inner casing 6B aligned with the holes 6e, to the outside of the housing 6. Slipout-preventing elements, not shown, are mounted on the electric power lines 31 and fitted in the holes 6e, similarly to the control line 32, to protect the second circuit board 25 against a pulling force applied from the outside.

Further, the second circuit board 25 is provided with magnetic detection elements for detecting the position of the rotor 8 of the electric motor 4, specifically, totally six magnetic detection elements consisting of three ones for detecting the position of the rotor during rotation in the positive direction, and three ones for detecting the position of the same in the negative or reverse direction. In the illustrated embodiment, Hall elements 26 are employed as the magnetic detection elements.

The Hall elements 26 are circumferentially arranged on the second circuit board 25 at equal intervals in radially facing relation to the magnet elements 8d mounted in the outer peripheral surface of the thinned portion 8e of the rotor 8, whereby the angular or rotational position of the rotor 8 is detected from output signals from the Hall elements 26. Each Hall element 26 has three pins which are fitted through holes formed in the second circuit board 25 and joined thereto by soldering.

FIG. 2 shows the construction of an assembly jig which can be used for assembling the wheel motor 1 of FIG. 1.

The assembly jig 101 is mainly comprised of a shaft 103 carrying a knob 102 secured thereto at an upper end thereof, a link-operating element 104 in the form of an elongated hollow cylinder, through which the shaft 203 is slidably fitted, a link 105 for engagement with the hook 8e of the rotor 8, a link support member 106 in the form of a hollow cylinder supporting the link 105, a casing 107 also in the form of a hollow cylinder accommodating part of the link-operating element 104, part of the link support element 106 and the link 105. The knob 102 is threadedly fitted on an upper end of the link-operating element 104, and a know 108 on an axially intermediate portion of the same, respectively.

The link-operating element 104 has an outer peripheral surface thereof formed with an external thread 104a, while the knobs 102 and 108 have inner peripheral surfaces thereof formed with internal threads for engagement with the external thread 104a of the link-operating element 104. The link-operating element 104 has a lower end thereof located within the casing 107 and formed integrally with a plurality of (four in the present embodiment) beams 104b radially extending in a cruciform array.

The link 105 is comprised of a plurality of (four in the present embodiment) engaging portions 105b each having a claw 105a formed integrally thereon for engagement with the hook 8f of the rotor 8, and a plurality of (four in the embodiment) arms 105c coupled to the respective engaging portions 105b for causing the claws 105a to move in a radially inward direction or a radially outward direction (hereinafter referred to as "the closing direction" and "the opening direction", respectively). Each engaging portion 105b is supportedly coupled at an end thereof to the link support member 106 by means of a bolt 106a for pivotal movement about the bolt 106a through a predetermined angle at the maximum, and at the other end thereof to an end of the corresponding arm 105c by means of a bolt 105d for pivotal movement about the bolt 105d through a predetermined angle at the maximum, respectively. The other end of each arm 105c is coupled to the corresponding beam 104b of the link-operating element 104 by means of a bolt 105e for pivotal movement about the bolt 105e through a predetermined angle at the maximum.

The link support member 106 is rotatably supported by the shaft 103 via a bearing 109 formed by a ball bearing or the like such that rotation of the shaft 103 is not transmitted to the link support member 106. The casing 107 is also rotatably supported by the knob 108 via a bearing 110 formed by a ball bearing or the like such that rotation of the knob 108 is not transmitted to the casing 107.

The casing has an inner peripheral surface thereof formed with longitudinal grooves 107a in which radially outer ends of the respective beams 104b are slidably fitted to prevent rotation of the link-operating element 104 about the shaft 103. In other words, the longitudinal grooves 107a act in cooperation with the beams 104b fitted therein to keep constant a relative circumferential position between the link-operating element 104 and the shaft 103 when the knob 108 is rotated, and hence prevent occurrence of torsions in the link 105 and the link support member 106 due to rotation of the link 105 when the link-operating element 104 is axially moved upward or downward along the shaft 103 with the hook 8f of the rotor 8 and the claws 105a engaged with each other.

A lower end of the casing 107 is rigidly fitted in a central hole 111a formed in a base member 111 which is to be in contact with the stator 7, etc. in operating the assembly jig 101.

The operation of the assembly jig 101 constructed as above will now be described with reference to FIGS. 3 through 7.

Figure 3:
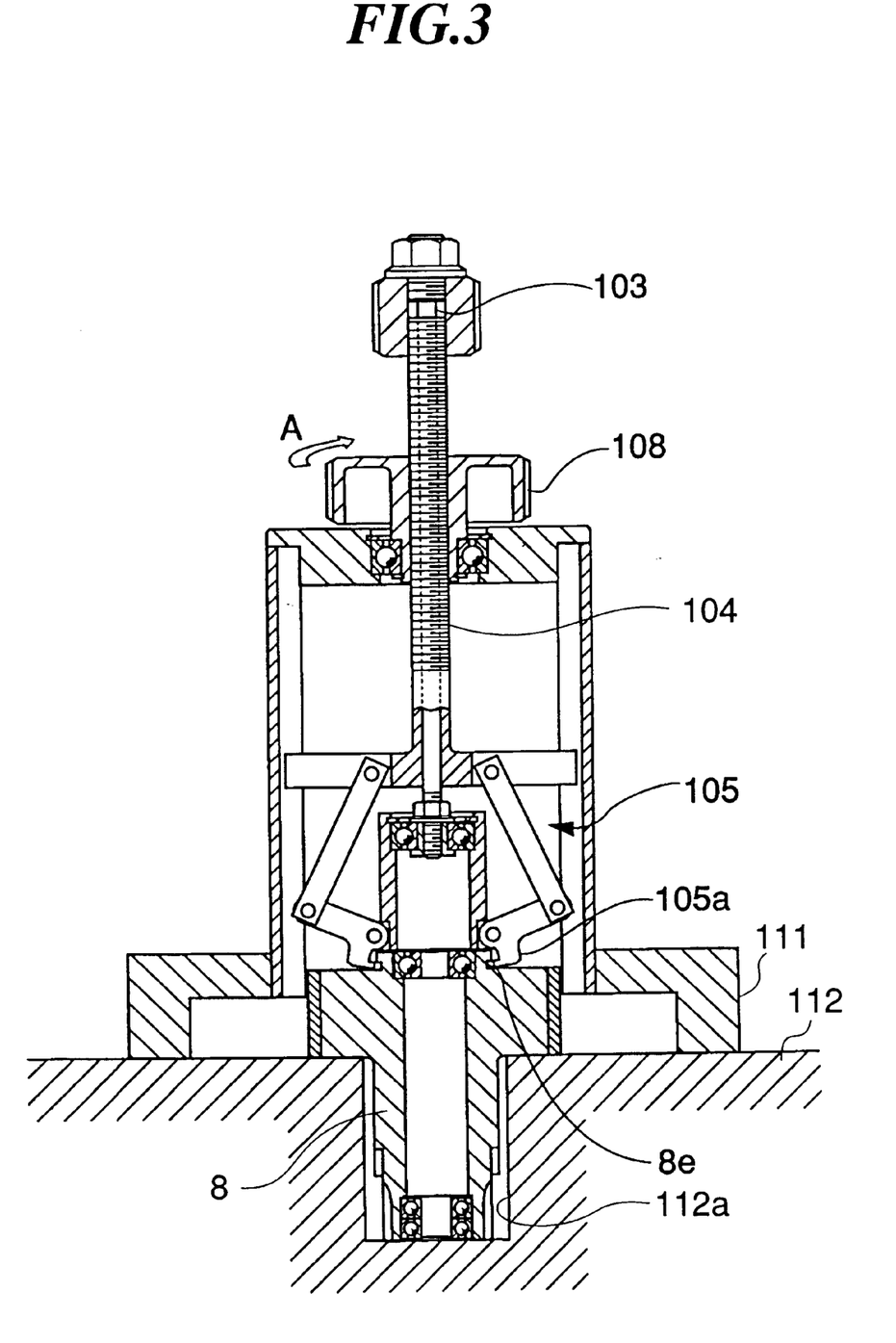
FIG. 3 is a view similar to FIG. 2, which is useful in explaining the operation of the assembly jig.

To mount the rotor 8 into the assembly jig 101, as shown in FIG. 3, the base member 111 is placed in contact with a surface of a container 112 in which the rotor 8 is stored, in alignment with the axis of the rotor 8, i.e. the axial through hole 8*a* thereof, and then the knob 108 is rotated in a clockwise direction indicated by an arrow A as viewed from above in the figure, to downwardly move the link-operating element 104 and hence the link 105 along the shaft 103 into a position where the claws 105*a* can engage the hook 108*f* of the rotor 8.

Figure 4:
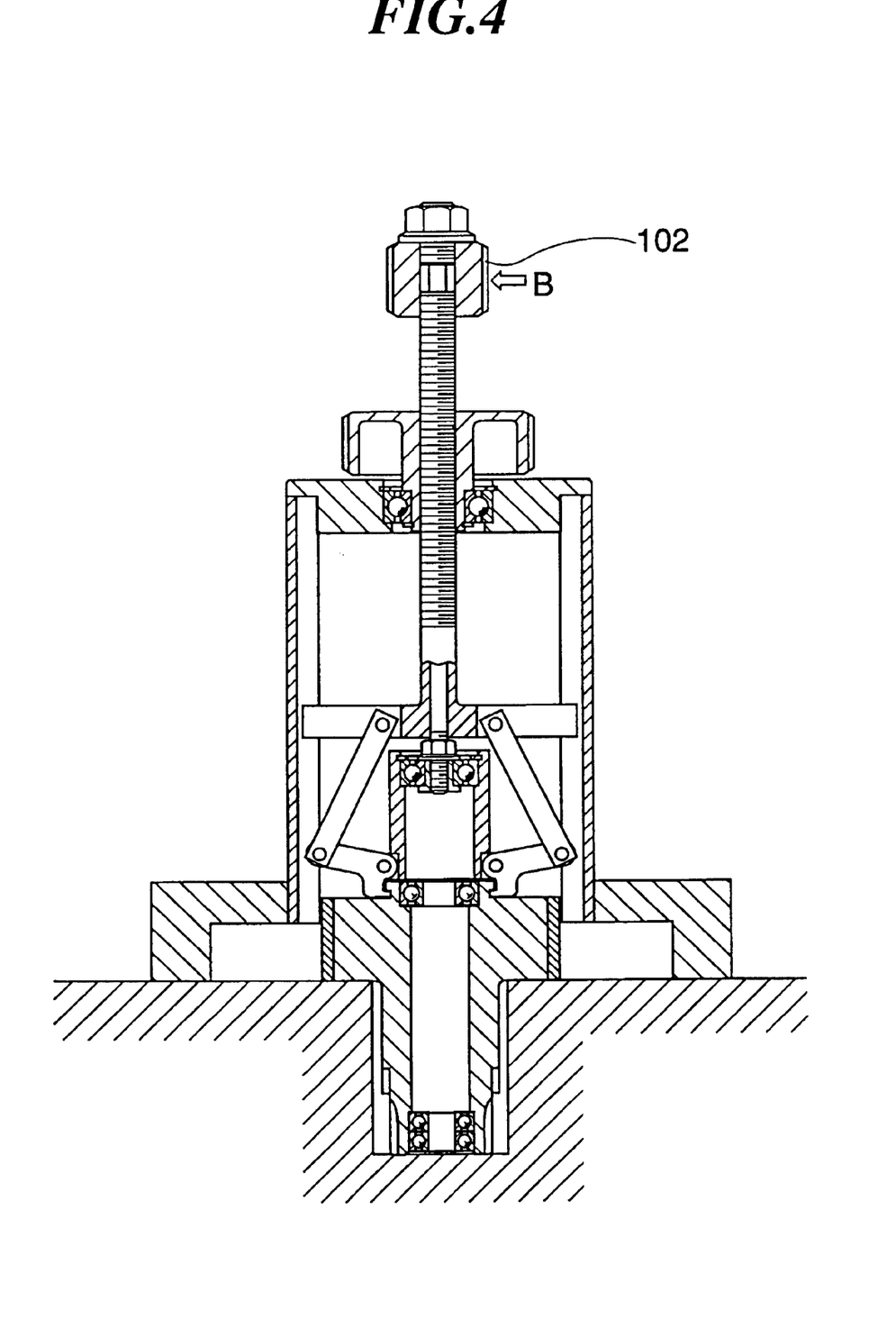
FIG. 4 is a view similar to FIG. 2, which is useful in explaining the operation of the assembly jig.
Figure 5:
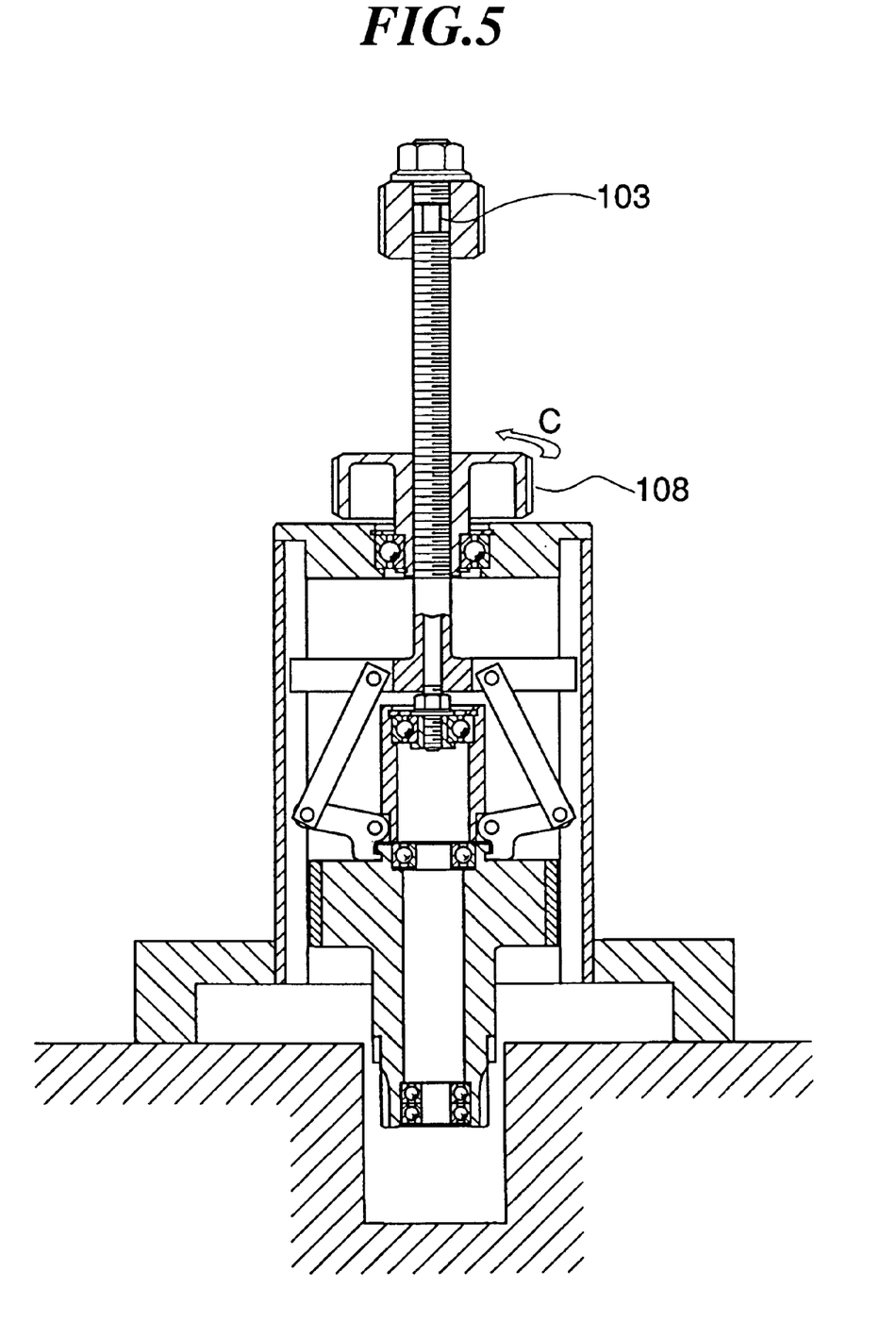
FIG. 5 is a view similar to FIG. 2, which is useful in explaining the operation of the assembly jig.

After the link 105 is brought into a position where the claws 105*a* can engage the hook 8*f*, as shown in FIG. 4, the knob 102 is rotated in a clockwise direction indicated by an arrow B as viewed from above in the figure to upwardly move the shaft 103*a* and hence the link support member 106 to thereby move the claws 15 in the closing direction into engagement with the hook 8*f* of the rotor 8. Then, as shown in FIG. 5, the knob 108 is rotated in a direction indicated by an arrow C, i.e. a direction opposite to the direction indicated by the arrow A to upwardly move the link 105 along the shaft 103 with the claws 105*a* engaged in the hook 8*f*.

Figure 6:
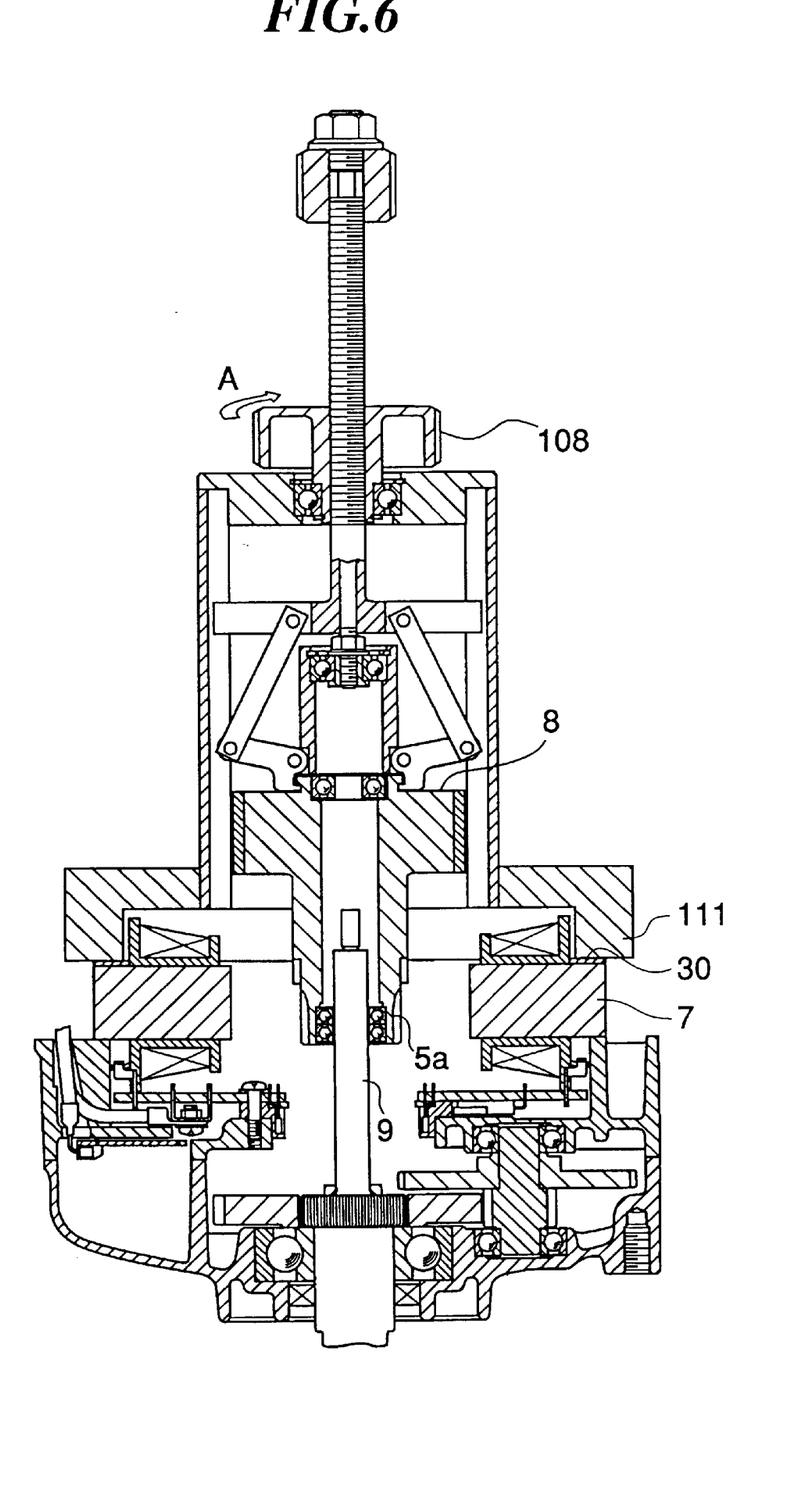
FIG. 6 is a view similar to FIG. 2, which is useful in explaining the operation of the assembly jig.
Figure 7:
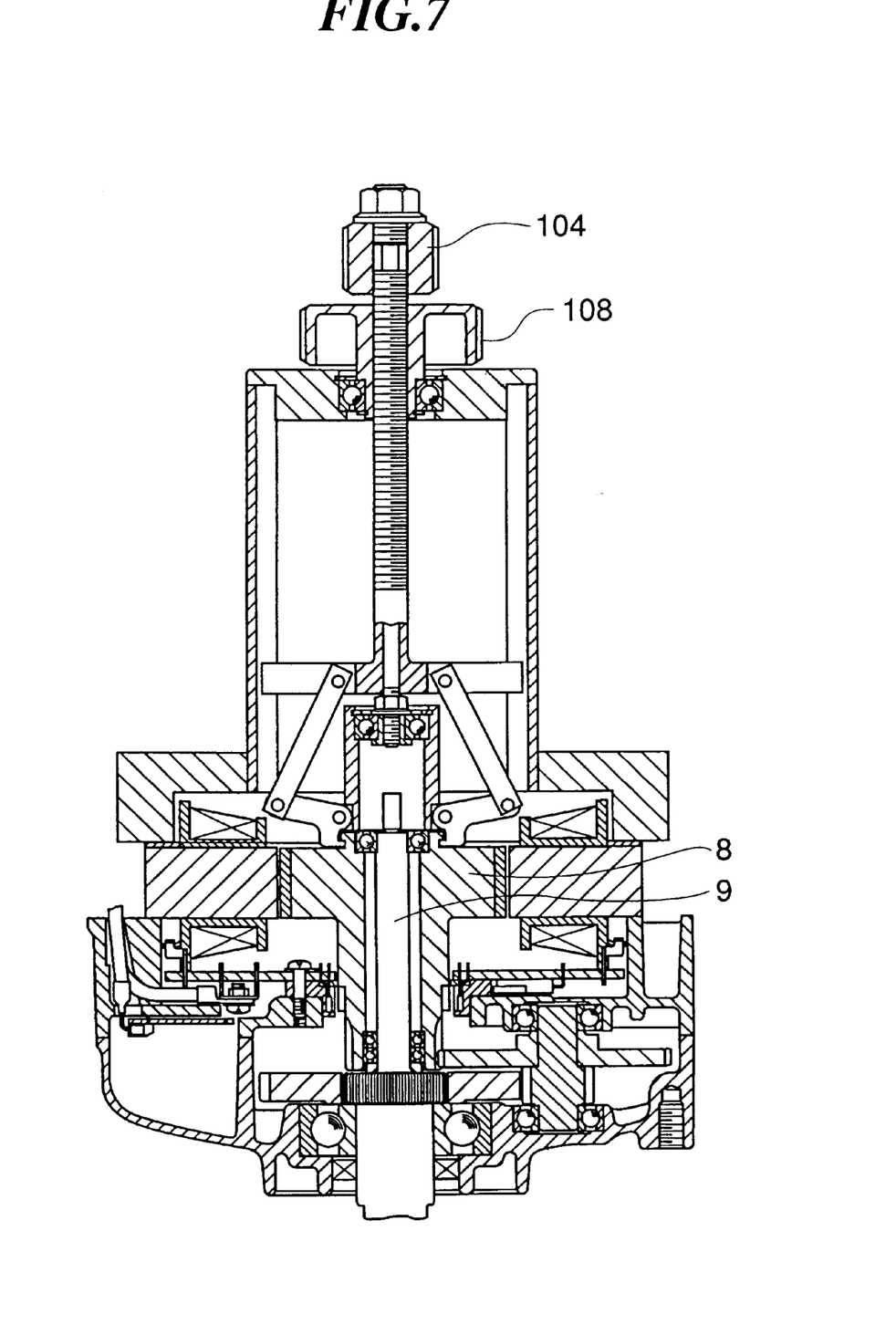
FIG. 7 is a view similar to FIG. 2, which is useful in explaining the operation of the assembly jig.

To mount the rotor 8 thus carried by the assembly jig 101 into the wheel motor 1, as shown in FIG. 6, the base member 111 is brought into contact with the stator 7 of the wheel motor 1 via the retaining plate 30 previously fitted on the stator 7, in such a manner that the axial through hole 8*a* of the rotor is axially aligned with the axis of the output shaft 9 which is previously mounted in a predetermined position. Then, the knob 108 is slowly rotated in the direction indicated by the arrow A to slowly fit the rotor 8 onto the output shaft 9 with the tip of the thinned portion 8*e* positioned ahead, into a position shown in FIG. 7 where the rotor 8 is completely fitted on the output shaft 9 along its whole axial length.

As described above, according to the present embodiment, the helical gear 5*a* is formed integrally on one end of the rotor 8, which forms part of the gear reducer 5 which is located in the vicinity of the one end of the rotor 8, while the hook 8*f* is formed integrally on the other end of the rotor 8 for engagement with the assembly jig 101 in the axial direction of the output shaft 9, whereby the construction of the motor with the gear reducer can be simplified.

Further, the rotor 8 carried by the assembly jig 101 with its hook 8*f* engaged by the link 105 is mounted into the wheel motor 1 by fitting the axial through hole 8*a* of the rotor 8 onto the output shaft 109 in such a manner that a resisting force of the rotor 8 against a magnetic attraction force generated between the rotor 8 and the stator 7 is progressively attenuated after the rotor 8 is fitted onto the output shaft 9, to thereby enable mounting the rotor 8 in place while preventing contact or collision between the rotor 8 and the stator 7 as well as collision between gears of the gear reducer 5. Thus, assemblage of the motor with gear reducer can be simplified and facilitated and the construction of the motor can be simplified.

Although in the above described embodiment the assembly jig 101 is constructed such that opening and closing of the claws 105*a* and upward and downward movement of the link 105 are made by manually rotating the knobs 102 and 108, this is not limitative. Alternatively, an assembly jig may be employed which makes these operations by means of air cylinders or the like. Further, although in the above described embodiment the assembly jig 101 is placed in a vertical position in operation such that the link 105 is moved in vertical or upward and downward directions, this is also not limitative, but the assembly jig 101 may be horizontally placed to move the link 105 in horizontal or leftward and rightward directions.

Although in the above described embodiment the assembly jig 101 is used to fit the rotor 8 onto the output shaft 9, this is not limitative, but it may be used to remove the rotor 8 from the motor by pulling the rotor 8 from the output shaft 109, for example, in carrying out a maintenance operation. Such a maintenance operation can be realized by making the above described operations in reverse directions to those mentioned above to perform an operation of removing or pulling the rotor from the motor with ease, thereby enhancing the efficiency of a maintenance operation or a like operation.

Further, moving means for moving the rotor with respect to the output shaft is not limited to the assembly jig. Alternatively of using the assembly jig, a robot may be used to perform e.g. an operation of slowly moving the rotor onto and along the output shaft by engaging the hook of the rotor by arms of the robot, for example.

What is claimed is:

1. In a motor with a gear reducer including a housing having opposite ends, a stator secured to said housing and having an inner periphery thereof defining a central space therein, a rotor formed of a magnet material and rotatably fitted in said central space of said stator, said rotor having an axial through hole formed therein in coaxial relation to an axis of rotation of said rotor, a gear reducer, and an output shaft connected through said gear reducer to said rotor to be rotatively driven thereby, for outputting a rotating output from said rotor through said gear reducer, said output shaft extending through said axial through hole of said rotor and being rotatably supported by said opposite ends of said housing, the improvement wherein said rotor has a gear forming part of said gear reducer formed thereon at one end thereof, and a hook formed thereon at another end thereof and engageable with a moving device in an axial direction of said output shaft.

2. A motor with a gear reducer as claimed in claim 1, wherein said rotor has an end face at said another end thereof, said axial through hole of said rotor has a marginal edge of an open end thereof opening in said end face and, said hook axially projecting from said end face of said rotor in concentricity with said marginal edge of said open end of said axial through hole of said rotor.

3. A motor with a gear reducer as claimed in claim 1, including at least one bearing rotatably supporting said rotor on said output shaft.

4. A motor with a gear reducer as claimed in claim 1, wherein said moving device comprises an assembling jig for assembling said rotor onto said output shaft.

5. A method of assembling a motor with a gear reducer including a housing having opposite ends, a stator secured to said housing and having an inner periphery thereof defining a central space therein, a rotor formed of a magnet material and rotatably fitted in said central space of said stator, said rotor having an axial through hole formed therein in coaxial relation to an axis of rotation of said rotor, a gear reducer, said rotor having a gear forming part of said gear reducer formed thereon at one end thereof, and a hook formed thereon at another end thereof and engageable with a moving device in an axial direction of said output shaft, and an output shaft connected through said gear reducer to said rotor to be rotatively driven thereby, for outputting a rotating output from said rotor through said gear reducer, said output shaft extending through said axial through hole of said rotor and being rotatably supported by said opposite ends of said housing, the method comprising the steps of:

engaging said moving device with said hook of said rotor;

placing said moving device engaged with said hook of said rotor in a predetermined position with respect to said motor in which said axial through hole of said rotor is axially aligned with an axis of said output shaft; and slowly moving said rotor onto and along said output shaft by said moving device engaged with said hook of said rotor against a magnetic attraction force generated between said rotor and said stator, thereby mounting said rotor in a predetermined position within said motor.

6. A method as claimed in claim 5, including the step of rotatably supporting said rotor on said output shaft via at least one bearing.

7. A method as claimed in claim 5, wherein said moving device comprises an engaging section having a plurality of claws for engagement with said hook of said rotor, an operating section for operating said engaging section for performing engagement and disengagement of said claws with and from said hook, and a moving section for slowly moving said rotor along said output shaft, with said claws engaged with said hook of said rotor.

8. A method of maintaining a motor with a gear reducer including a housing having opposite ends, a stator secured to said housing and having an inner periphery thereof defining a central space therein, a rotor formed of a magnet material and rotatably fitted in said central space of said stator, said rotor having an axial through hole formed therein in coaxial relation to an axis of rotation of said rotor, a gear reducer, said rotor having a gear forming part of said gear reducer formed thereon at one end thereof, and a hook formed thereon at another end thereof and engageable with a moving device in an axial direction of said output shaft, and an output shaft connected through said gear reducer to said rotor to be rotatively driven thereby, for outputting a rotating output from said rotor through said gear reducer, said output shaft extending through said axial through hole of said rotor and being rotatably supported by said opposite ends of said housing, the method comprising the steps of:

engaging said moving device with said hook of said rotor;

placing said moving device engaged with said hook of said rotor in a predetermined position with respect to said motor in which said axial through hole of said rotor is axially aligned with an axis of said output shaft; and slowly moving said rotor along said output shaft by said moving device engaged with said hook of said rotor against a magnetic attraction force generated between said rotor and said stator, thereby removing said rotor from said motor.

9. A method as claimed in claim 8, wherein said moving device comprises an engaging section having a plurality of claws for engagement with said hook of said rotor, an operating section for operating said engaging section for performing engagement and disengagement of said claws with and from said hook, and a moving section for slowly moving said rotor along said output shaft, with said claws engaged with said hook of said rotor.

\* \* \* \* \*